US012462991B2

(12) United States Patent
Hernandez Maya

(10) Patent No.: US 12,462,991 B2
(45) Date of Patent: Nov. 4, 2025

(54) EROSION RESISTANT COMPOSITE METAL COATING FOR PLATES OF AN ARC CHUTE ASSEMBLY FOR A CIRCUIT BREAKER

(71) Applicant: Siemens Industry, Inc., Alpharetta, GA (US)

(72) Inventor: Roberto Carlos Hernandez Maya, Nuevo Leon (MX)

(73) Assignee: Siemens Industry, Inc., Alpharetta, GA (US)

( * ) Notice: Subject to any disclaimer, the term of this patent is extended or adjusted under 35 U.S.C. 154(b) by 266 days.

(21) Appl. No.: 18/457,529

(22) Filed: Aug. 29, 2023

(65) Prior Publication Data

US 2025/0079095 A1 Mar. 6, 2025

(51) Int. Cl.

| | |
|---|---|
| ***H01H 9/36*** | (2006.01) |
| ***H01H 9/34*** | (2006.01) |
| ***H01H 69/00*** | (2006.01) |
| ***H01H 71/02*** | (2006.01) |
| ***H01H 73/18*** | (2006.01) |

(52) U.S. Cl.
CPC .............. *H01H 9/36* (2013.01); *H01H 9/346* (2013.01); *H01H 69/00* (2013.01); *H01H 71/025* (2013.01); *H01H 73/18* (2013.01)

(58) Field of Classification Search
CPC .......... H01H 9/36; H01H 9/341; H01H 9/346; H01H 9/46; H01H 9/362; H01H 2009/365; H01H 2009/367; H01H 71/025; H01H 73/18; H01H 73/12; H01H 69/00; H01H 33/182
USPC ...................... 218/149, 150, 38, 41, 46, 105
See application file for complete search history.

(56) References Cited

U.S. PATENT DOCUMENTS

| | | | | |
|---|---|---|---|---|
| 8,097,824 | B2 * | 1/2012 | Kil | H01H 9/36 218/156 |
| 8,809,721 | B2 * | 8/2014 | Kratzschmar | H01H 9/34 218/150 |
| 8,829,380 | B2 * | 9/2014 | Haeberlin | H01H 9/345 218/34 |
| 9,040,864 | B2 * | 5/2015 | Kharade | H01H 9/36 335/22 |
| 9,343,251 | B2 * | 5/2016 | Juds | H01H 9/443 |
| 9,431,197 | B2 * | 8/2016 | Engewald | H01H 33/182 |
| 9,704,676 | B1 * | 7/2017 | Cardwell | H01H 9/362 |
| 10,650,993 | B1 | 5/2020 | Kim et al. | |
| 2009/0314746 | A1 * | 12/2009 | Bahlinger | H01H 33/10 218/34 |
| 2014/0202990 | A1 * | 7/2014 | Puhalla | H01H 73/18 218/148 |

* cited by examiner

*Primary Examiner* — William A Bolton

(57) ABSTRACT

An arc plate for a circuit breaker includes a body and a magnetic coating that covers an exterior of the body. The magnetic coating is a metal matrix composite including from 80 to 92 volume percentage of a metal that is magnetic, and from 8 to 20 volume percentage of particles. The particles have a higher melting temperature than the metal.

20 Claims, 6 Drawing Sheets

EROSION RESISTANT COMPOSITE METAL COATING FOR PLATES OF AN ARC CHUTE ASSEMBLY FOR A CIRCUIT BREAKER

BACKGROUND

1. Field of the Disclosure

The present disclosure is generally directed to plates of an arc chute assembly for a circuit breaker and, more specifically, plates of an arc chute assembly for a circuit breaker that includes an erosion resistant composite metal coating.

2. Description of Related Art

The purpose of circuit breakers is to switch on and off operating or fault current in electric circuits. The current flows in a circuit controlled by the circuit breaker, through metal contacts. When the circuit breaker is turned off or moved to an off position by a fault in the current, the metal contacts are separated. When a short-circuit occurs, a heavy current flows through the metal contacts of the circuit breaker before the metal contacts are opened by the protective system. When the circuit breaker opens, a large fault current continues to flow for a short time by arcing across airspace (e.g., an arc medium) between the metal contacts. As long as the arc is sustained between the metal contacts, the current through the circuit breaker will not be interrupted because the arc is itself a conductive path of electricity. For total interruption in the circuit breaker, the arc is to be quenched as quickly as possible.

In a high resistance method of extinguishing the arc, the arc may be split to increase a resistance of the arc medium. For this purpose, an arc chute assembly works by dividing and quenching the arc in the circuit breaker. The arc chute assembly may include a number of U-shaped metal plates (e.g., arc plates) that surround the metal contacts. The arc splitting may start when the metal contacts are opened, and the arc runs along the arc plates.

The process of extinguishing the arc may be divided into three stages. In stage one, arc ignition and commutation, the arc is ignited once the metal contacts separate from each other. Stage one may take around 8.0 ms. Stage two includes arc stagnation and back commutation, and may occur between 8.5 ms and 10 ms after the start of the process. Stage three includes arc splitting and extinguishing and may occur between 10 ms to 12.5 ms after the start of the process.

Low carbon steel may be used for the arc plates due to the ferromagnetic properties of low carbon steel. Low carbon steel may, however, suffer from different issues during the arc extinguishing process. As a result of higher temperatures in the arc, the curie temperature of low carbon steel, above which the material loses magnetic properties, may be reached. Another issue is related to erosion of the low carbon steel plates during arc extinction. Due to the higher temperatures reached at the arc moment, melted material may be expelled and accumulated in internal parts of the circuit breaker and/or on the arc plates themselves. This may promote a short circuit between the arc plates and, for example, consumption of the plates, which may affect the integrity of the arc chute assembly.

The prior art has addressed these issues by varying a number of arc plates within the arc chute assembly, a distribution of the arc plates, a shape of the arc plates, a type of insulating material filling gaps between each arc plate, and/or a type of material for a housing of the arc chute assembly. Further, different refractory materials have been used to extinguish the arc.

SUMMARY

In one example, an arc plate for a circuit breaker includes a body and a magnetic coating that covers an exterior of the body. The magnetic coating is a metal matrix composite including from 80 to 92 volume percentage of a metal that is magnetic, and from 8 to 20 volume percentage of particles. The particles have a higher melting temperature than the metal.

In one example, the metal is nickel.

In one example, the particles are silicon carbide particles.

In one embodiment, the particles are alumina particles.

In one example, the metal matrix composite includes from 84 to 88 volume percentage of nickel, and from 12 to 16 volume percentage of silicon carbide particles.

In one example, the particles have a maximum dimension in a range of 1 μm to 3 μm.

In one example, the particles are irregularly shaped.

In one example, the body is made of low-carbon steel.

In one example, the magnetic coating has a thickness in a range of 7.5 μm to 12.5 μm.

In one example, distribution of the particles within the metal is homogenous.

In one example, a circuit breaker includes an arc chamber including a plurality of arc plates. Each arc plate of the plurality of arc plates includes a body made of steel, and a magnetic coating that covers an exterior of the body. The magnetic coating is a metal matrix composite including from 80 to 92 volume percentage of nickel, and from 8 to 20 volume percentage of silicon carbide particles.

In one example, the silicon carbide particles have a maximum dimension in a range of 1 μm to 3 μm.

In one example, the silicon carbide particles are irregularly shaped.

In one example, the magnetic coating has a thickness in a range of 7.5 μm to 12.5 μm.

In one example, the arc chamber further includes a plastic housing. The plastic housing includes a first support and a second support. The second support is opposite and at a distance relative to the first support. Opposite sides of the plurality of plates are attached to the first support and the second support, respectively, such that the plurality of plates are separated from each other.

In one example, a method of manufacturing an arc plate for a circuit breaker includes providing a steel body, and applying a composite metal coating to an exterior surface of the steel body. The applying of the composite metal coating includes performing an electrodeposition of nickel onto the steel body using a bath, and adding silicon carbide particles to the bath during the performing of the electrodeposition. After the applying the composite metal coating includes from 80 to 92 volume percentage of nickel, and from 8 to 20 volume percentage of the silicon carbide particles.

In one example, providing the steel body includes stamping a U-shaped body of low carbon steel.

In one example, the adding includes adding silicon carbide particles with a maximum dimension in a range between 1 μm and 3 μm.

In one example, the silicon carbide particles are irregularly shaped.

In one example, the applying of the composite metal coating further includes constantly stirring the bath, such that a homogenous distribution of the silicon carbide particles is provided within the composite metal coating.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
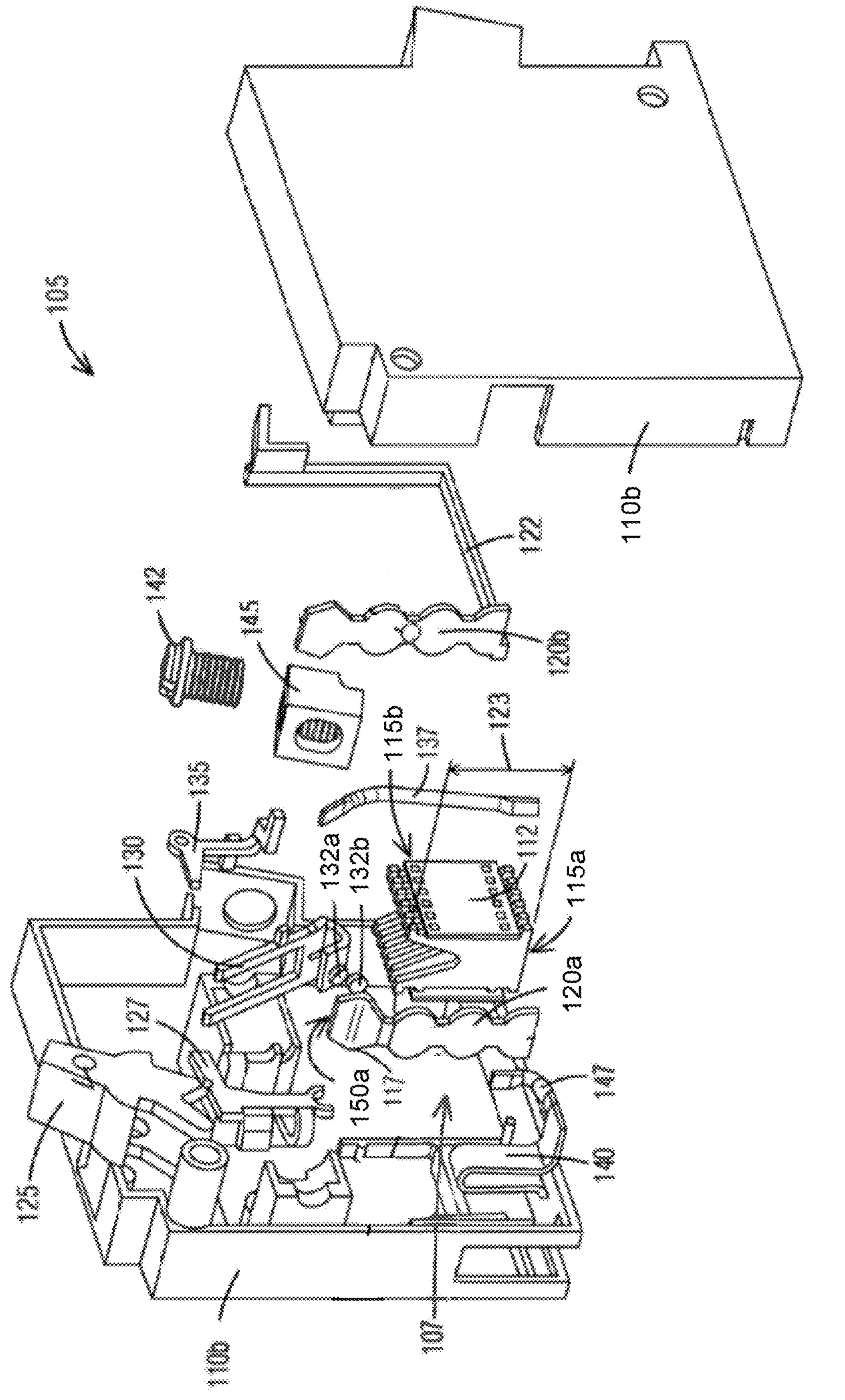
FIG. 1 is an exploded view of one embodiment of a circuit breaker.

A life of a circuit breaker may be increased by slowing or preventing the degradation of metal arc plates of an arc chute assembly that may be caused by repeated arc extension within the circuit breaker. Low carbon steel, which is used for a body of an arc plate of the arc chute assembly, may be plated with a metal coating, such as, for example, nickel. The low carbon steel body may be plated with the metal coating using, for example, electroless plating. The nickel metal coating being magnetic helps the arc plates of the arc chute assembly attract the arc. The nickel metal coating also prevents corrosion of the low carbon steel arc plates.

The metal coating for the arc plates of the present embodiments is a composite metal coating. The composite metal coating is formed with nickel metal as a metal matrix, with an addition of silicon carbide (SiC) particles as reinforcement. The composite metal coating is applied in a co-deposition process to the low carbon steel body of the arc plate, for example.

The composite metal coating preserves the individual properties of the nickel coating, such as, for example, crystallinity, preferential exposed planes, and magnetic character. Further, the presence of SiC particles within the composite metal coating contributes to an increase in hardness and wear resistance, which increases a wear resistance of an arc plate including the composite metal coating during the arc extension moment.

The composite metal coating may be applied following a co-deposition process, where the SiC particles are added to a bath during the electrodeposition of nickel over a surface of the low carbon steel arc plate, under constant stir. This may provide a homogeneous distribution of the SiC particles, without agglomeration or cluster formation. The composite metal coating may include SiC particles with a greatest dimension in a range of, for example, 1 μm to 3 μm, and the SiC particles may be in a range of, for example, 8% to 20% volume percentage of the composite.

The use of a composite metal coating of the present embodiments may help preserve the integrity of arc plates of an arc plate assembly, increasing a wear resistance property of the arc plates. This enhanced capacity of the composite coating is due to the presence of the SiC particles, distributed homogeneously within the nickel coating. The composite metal coating of the present embodiments may also provide a higher melting point (e.g., approximately 2730° C.) for an arc plate of the present embodiments compared to arc plates of the prior art. This may increase the life of each arc plate, decreasing an amount of the melted pieces of material compared to prior art arc plates. Properties of the nickel, such as, for example, magnetic properties and anticorrosive properties, are preserved.

These and other objects, features, and advantages will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 is an exploded view of one embodiment of a circuit breaker 105. The circuit breaker 105 may be for any number of different types of circuit breakers and may have any number of different ratings. For example, the circuit breaker 105 may be pluggable, may be for a three-pole circuit breaker, and may have a continuous current rated value of, for example, 50 A. The circuit breaker 105 may, for example, be for a 240 V supply. In other embodiments, the circuit breaker 105 is a single-pole circuit breaker with a continuous current rated value of, for example, 20 A, for a 120 V supply. Other types of circuit breakers and/or other ratings may be provided.

The circuit breaker 105 includes a housing 110. The housing 110 includes, for example, a base 110*a* and a cover 110*b*. The housing 110 of the circuit breaker 105 may be any number of shapes and/or sizes. For example, the housing 110 of the circuit breaker 105 is rectangular in shape and may have any number of dimensions. For example, the housing may have a depth of 7.0 inches, a height of 4.0 inches, and a width of 2.0 inches. The housing 110 may be made of any number of electrically insulating materials. For example, the housing 110 is made of a plastic. Other configurations (e.g., material, shape, and/or size) of the housing 110 may be provided.

The housing 110 of the circuit breaker 105 houses and/or supports any number of components of the circuit breaker 105. For example, the circuit breaker 105 includes, and the housing 110 of the circuit breaker 105 houses and/or supports, a handle 125, a cradle 127, a moving arm 130, a moving contact 132*a*, an armature 135, a stationary contact 132*b*, a load connecting braid 137, a line terminal 140, a lug 142, a bolt 145, and a line connecting braid 147. A stationary contact plate 117 includes the stationary contact 132*b*, and a load terminal 122 includes the load connecting braid 137 coupled to the moving arm 130 having the moving contact 132*a*.

The circuit breaker 105 may use one or more different trip elements to protect against thermal overloads, short circuits, and/or ground faults. For example, the circuit breaker 105 may include an electromagnet (e.g., configured to move the armature 135) and/or a bimetallic strip (e.g., the connecting braid 137) to trip a switch (e.g., the handle 125) and break the circuit between, for example, the lug 142 and the line terminal 140 in response to higher currents and/or higher temperatures within the circuit breaker 105 caused by a thermal overload, a short circuit, and/or a ground fault.

The circuit breaker 105 also includes an arc extinguishing chamber 107 (e.g., an arc chute assembly) supported by and within the housing 110 of the circuit breaker 105 (e.g., between the base 110*a* and the cover 110*b* of the housing 110 of the circuit breaker 105). The arc extinguishing chamber 107 includes a plurality of arc plates 112 having first sides 115*a* and second sides 115*b*. The plurality of arc plates 112 surround the moving contact 132*a* and the stationary contact 132*b* (e.g., the contacts 132*a*, 132*b*) when the contacts 132*a*, 132*b* are closed (e.g., when the contacts 132*a*, 132*b* are in physical contact with each other). When the contacts 132*a*, 132*b* separate from each other after the circuit breaker 105 is tripped (e.g., in response to a thermal overload, a short circuit, and/or a ground fault), an arc is ignited between the contacts 132*a*, 132*b*, the plurality of arc plates 112 of the arc extinguishing chamber 107 attract the arc, and the arc runs along the plurality of arc plates 112, where the arc is split and extinguished.

In the embodiment shown in FIG. 1, the stationary contact plate 117 includes a first arc runner 120*a* disposed adjacent to the first sides 115*a* of the plurality of arc plates 112 of the arc extinguishing chamber 107. The load terminal 122 includes a second arc runner 120*b* disposed adjacent to the second sides 115*b* of the plurality of arc plates 112 of the arc extinguishing chamber 107. When the arc is attracted by the plurality of arc plates 112 and the arc enters the plurality of arc plates 112, a length of a current path associated with the arc is reduced through the first arc runner 120*a* and the second arc runner 120*b* by reducing a resistance of the current path for the arc or by reducing a voltage across the circuit breaker 105.

In one embodiment, the stationary contact plate 117 includes the stationary contact 132*b*, and the load terminal 122 includes the load connecting braid 137 coupled to the moving arm 130 having the moving contact 132*a*, such that the first arc runner 120*a* and the second arc runner 120*b* each have a respective top end 150*a*. 150*b* that ends below the stationary contact 132*b* and the moving contact 132*a*.

In one embodiment, the first arc runner 120*a* may be disposed substantially parallel to the first sides 115*a* of the plurality of arc plates 112. Likewise, the second arc runner 120*b* may be disposed substantially parallel to the second sides 115*b* of the plurality of arc plates 112. In one embodiment, the first arc runner 120*a* may extend an entire height 123 of the plurality of arc plates 112. Similarly, the second arc runner 120*b* may extend the entire height 123 of the plurality of arc plates 112.

The components of the circuit breaker 105 (e.g., the arc extinguishing chamber 107) may be supported within (e.g., attached to) the housing 110 of the circuit breaker 105 in any number of ways. For example, one or more of the components of the circuit breaker 105 may be attached to the housing 110 of the circuit breaker 105 with fasteners, adhesive, welds, flanges, tabs, and/or other connectors.

Figure 2:
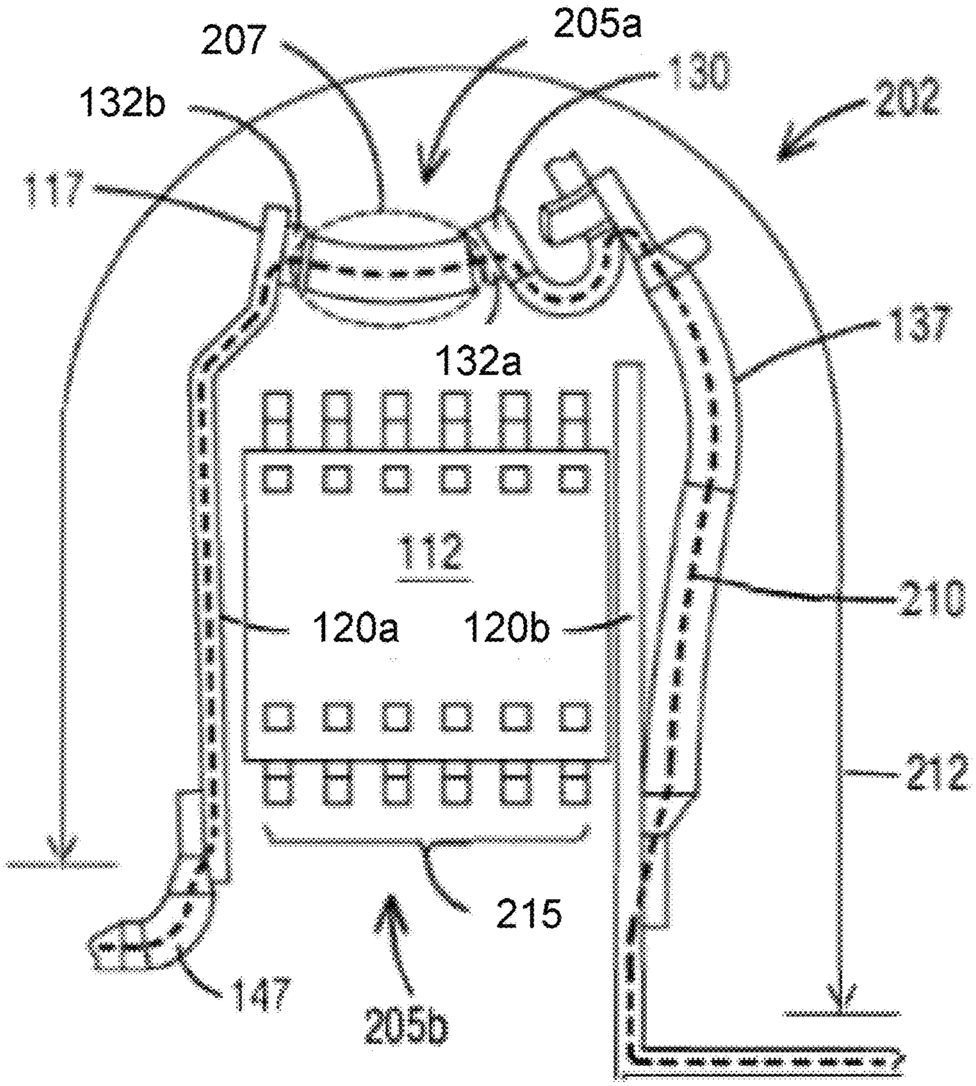
FIG. 2 illustrates an example of an arc at a moment of contact separation.

FIG. 2 illustrates an embodiment of an arc interruption mechanism 202 using the first arc runner 120*a* and the second arc runner 120*b* of FIG. 1. The arc interruption mechanism 202 includes a reduced current path arrangement 205*a* for an arc 207 at a moment of contact separation, and an arc plates arrangement 205*b* surrounded by the first arc runner 120*a* and the second arc runner 120*b* in accordance with an embodiment. The first arc runner 120*a* and the second arc runner 120*b* are arranged in the reduced current path arrangement 205*a*, which reduces restrike, enhances arc trapping, and increases arc mobility so the arc 207 may travel down the plurality of arc plates 112 quicker with a same amount of an electromagnetic force.

FIG. 2 shows an interruption with the arc 207 drawn between the contacts 132*a, b*, and a current path 210 is shown with a dashed line. As the arc 207 is attracted by the arc plates 112 and enters the arc plates 112, a length 212 of the current path 210 reduces. After the arc 207 passes the arc plates 112 into a lower empty area 215, the current path 210 shortens even more. Therefore, the arc 207 may stay in this lower empty area 215 instead of restriking back between the contacts 132*a, b*. The reduced current path arrangement 205*a* and the arc plates arrangement 205*b* reduces the amount of a hot gas going back to the contact area, and hence reduces the possibility for a restrike.

Figure 3:
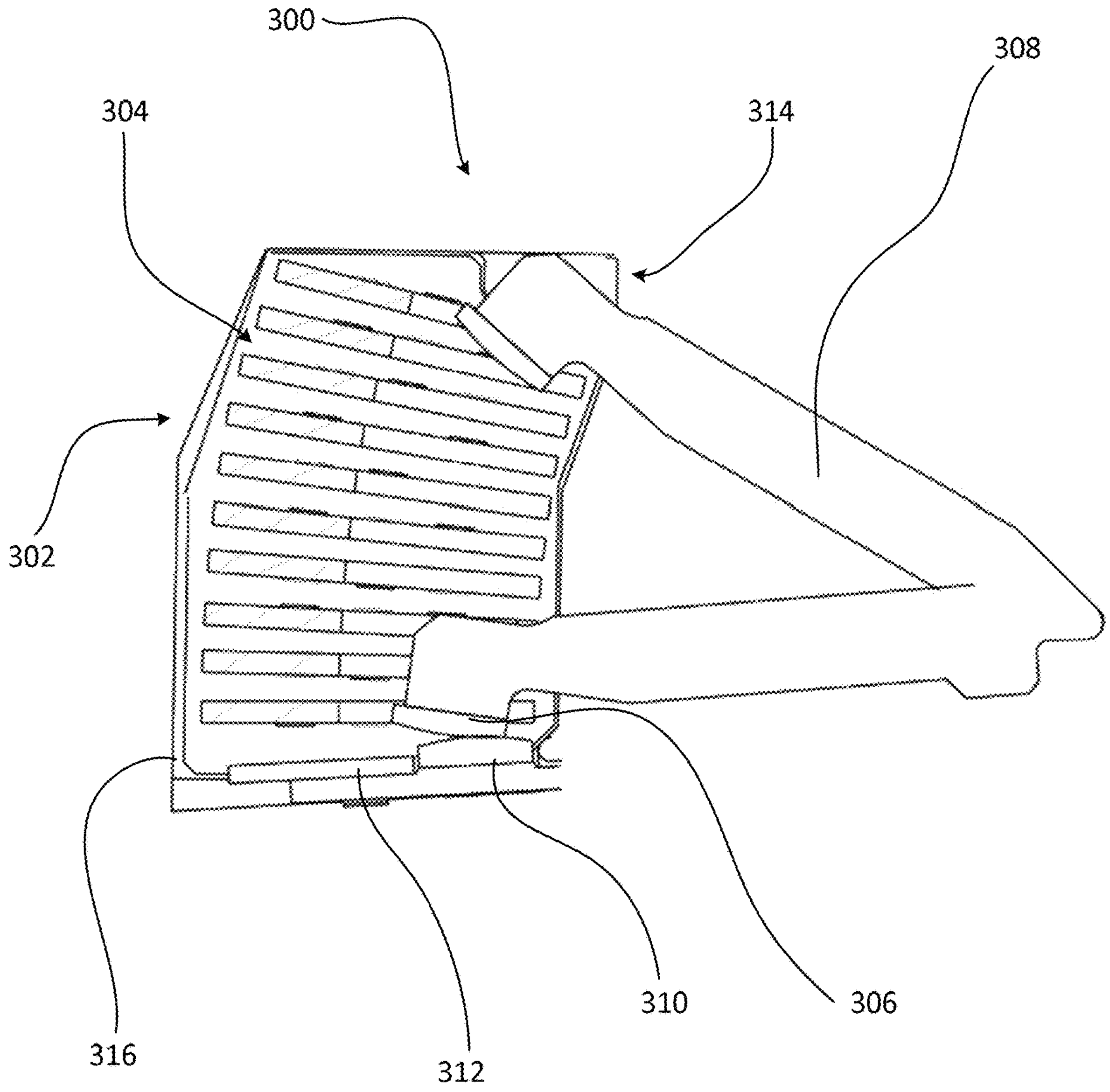
FIG. 3 is a cross-section of an arc chamber including arc plates of the present embodiments.
Figure 4:
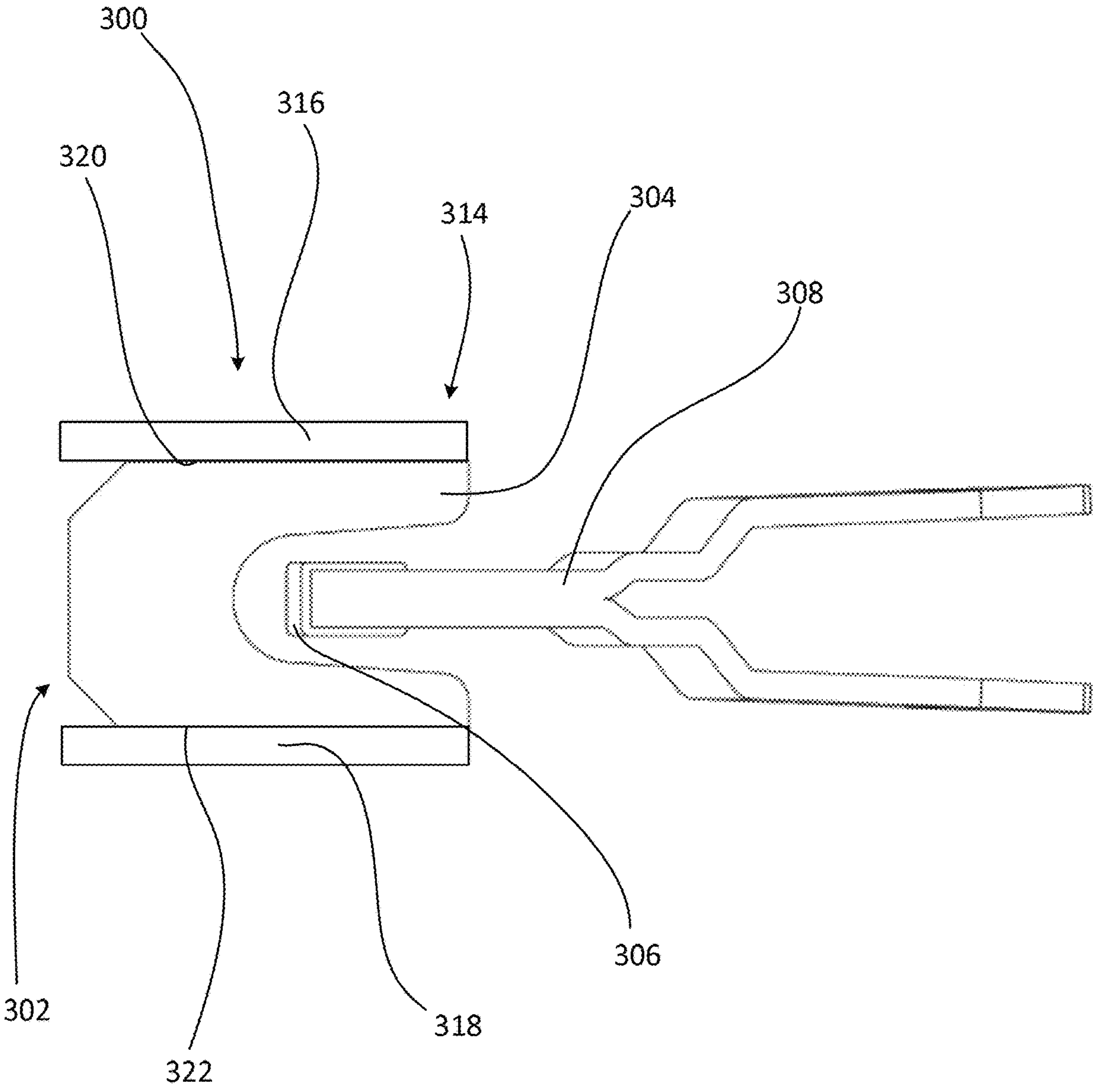
FIG. 4 is a top view of the arch chamber of FIG. 3.

FIGS. 3 and 4 illustrate another embodiment of an arc interruption mechanism 300 of a circuit breaker. The arc interruption mechanism 300 includes an arc chamber 302. The arc chamber 302 includes a plurality of arc plates 304. The plurality of arc plates 304 surround a movable contact 306 disposed on (e.g., supported by) a movable contact arm 308. When a circuit is made within the circuit breaker, the movable contact 306 on the movable contact arm 308 is in contact with a stationary contact 310 of a stationary contact arm 312. In response to an overcurrent or a short circuit, for example, a trip unit (e.g., an electromechanical trip unit including bimetals and electromagnets) of the circuit breaker causes the movable contact arm 308 to move (e.g., rotate) relative to the stationary contact arm 312 and the movable contact 306 to move away from the stationary contact 310. The movable contact 306 thus moves to open (e.g., break) the circuit.

When the movable contact 306 and the stationary contact 310 are opened, an arc forms across a gap between the movable contact 306 and the stationary contact 310. The arc chamber 302 and, more specifically, the plurality of arc plates 304 of the arc chamber 302 divide and quench the arc in the circuit breaker.

The arc chamber 302 includes a housing 314 that supports the plurality of arc plates 304, such that plurality of arc plates 304 are separated from each other. For example, the housing 314 of arc chamber 302 includes a first support 316 and a second support 318 opposite and at a distance relative to the first support 316.

The housing 314 (e.g., the first support 316 and the second support 318) of the arc chamber 302 may be any number of shapes and sizes, and may be made of any number of materials. For example, the first support 316 and the second support 318 may be plates that are shaped and sized based on shape(s) of the plurality of arc plates 304, size(s) of the plurality of arc plates 304, and/or a number of arc plates 304 included within the arc chamber 302. The housing 314 of the arc chamber 302 may be made of any number of electrically insulating materials such as, for example, a plastic. Other configurations of the housing 314 of the arc chamber 302 may be provided.

The arc chamber 302 may include any number of arc plates 304. For example, in the embodiment shown in FIGS. 3 and 4, the arc chamber 302 includes ten arc plates 304. Other embodiments may include more, fewer, and/or different arc plates 304.

The plurality of arc plates 304 may be supported by (e.g., attached to) the housing 314 in any number of ways. For example, first sides 320 of the plurality of arc plates 304 may be supported by (e.g., attached to) the first support 316 of the housing 314, and second sides 322 of the plurality of arc plates 304 may be supported by (e.g., attached to) the second support 318 of the housing 314. The first side 320 and the second side 322 of each arc plate of the plurality of arc plates 304 may be attached to the first support 316 and the second support 318, respectively, with connectors (e.g., fasteners), adhesive, tabs on the respective arc plate 304 and corresponding openings in the first support 316 and the second support 318, respectively, flanges, and/or other connectors.

In the embodiment shown, each arc plate of the plurality of arc plates 304 is U-shaped. Other shapes may be provided. For example, each arc plate of the plurality of arc plates 304 is V-shaped. The plurality of arc plates 304 may be any number of sizes. In one embodiment, the size and/or shape of each arc plate of the plurality of arc plates 304 is the same. In another embodiment, at least some arc plates of the plurality of arc plates 304 have different shapes and/or sizes. For example, at least some arc plates of the plurality of arc plates 304 are different U-shapes and/or have different thicknesses. Different configurations of the plurality of arc plates 304 may be provided.

Figure 5:
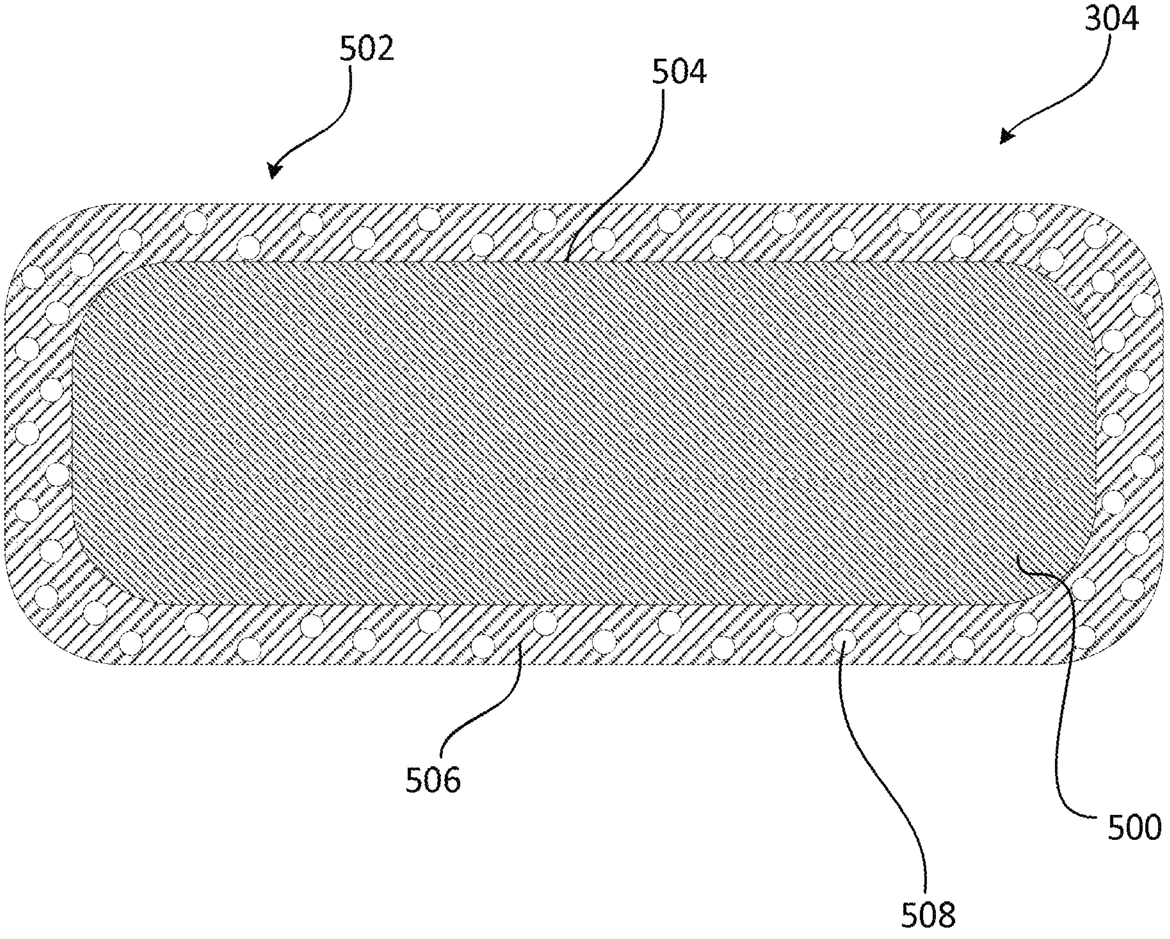
FIG. 5 is a cross section of one embodiment of an arc plate.

In one embodiment, each arc plate of the plurality of arc plates 304 is made of a same material. Referring to FIG. 5, each arc plate of the plurality of arc plates 304 may include a body 500 and a coating 502 (e.g., a magnetic coating). The body 500 of the respective arc plate 304 may be made of low carbon steel due to the ferromagnetic properties of low carbon steel. The ferromagnetic properties of low carbon steel help split the arc within the arc chamber 302.

Low carbon steel is fundamentally an alloy of iron and carbon. At room temperature, carbon is virtually insoluble in iron, with a maximum solubility of carbon of approximately 0.008 wt. %. Below 0.008 wt. %, a crystallographic structure is made up entirely of ferrite, which has a body-centered cubic (bcc) lattice. Above 0.008 wt. %, any carbon excess combines with iron to form cementite ($Fe_3C$). Thus, at room temperature, carbon steel is formed by a mixture of two phases, perlite and ferrite; perlite consist of platelets of cementite interspersed through the ferrite.

The body 500 of the respective arc plate 304 has, depending on the shape of the body 500, at least one outer surface 504 (e.g., an outer surface). The outer surface 504 of the body 500 is covered (e.g., completely covered) with the coating 502, such that, for example, no portion of the body 500 of the respective arc plate 304 is exposed.

Referring to FIG. 5, the coating 502 may be made of any number of materials. For example, the coating 502 is a metal matrix composite. The metal matrix composite includes a metal 506 and reinforcing particles 508. In one embodiment, the metal is nickel, as nickel is magnetic and may prevent corrosion of the low carbon steel body 500 of the respective arc plate 304. In other embodiments, the metal may be copper or zinc, though these metals are not magnetic materials. Other metals may be used within the metal matrix composite.

In one embodiment, the reinforcing particles 508 are silicon carbide particles. The presence of silicon carbide particles within the coating 502 increases a hardness and a wear resistance of the coating 502. Silicon carbide has a much higher melting temperature (e.g., approximately 2,730° C.) compared to nickel (e.g., approximately 1,452° C.), so the presence of silicon carbide particles within the coating 502 may increase a melting temperature of the coating 502. An increased melting temperature of the coating 502 may decrease an amount of melted material caused by repeated arcs generated within the circuit breaker, thus slowing degradation of the plurality of arc plates 304. This may increase a life of the plurality of arc plates 304. In another embodiment, the reinforcing particles 508 may be alumina. Other reinforcing particles may be used.

The reinforcing particles 508 may be any number of shapes and/or sizes. For example, in one embodiment, the reinforcing particles 508 are irregularly shaped. For example, the reinforcing particles 508 may have sides and angles (e.g., interior angles of different lengths and sizes. The reinforcing particles 508 may include different irregular shapes of different shapes and sizes. In another embodiment, at least some of the reinforcing particles 508 are spherical in shape. In yet another embodiment, at least some of the reinforcing particles 508 are cylindrically shaped. Other shapes of the reinforcing particles 508 may be provided.

In one embodiment, the reinforcing particles 508 are irregularly shaped but are of a controlled size. For example, the reinforcing particles 508 may have a largest dimension (e.g., a length) of between 1.0 and 3.0 μm. In another embodiment, the reinforcing particles 508 have the largest dimension of between 1.5 and 2.5 μm. In yet another embodiment, the reinforcing particles 508 have the largest dimension of between 2.0 and 4.0 μm. Other sizes may be provided.

In different embodiments, the coating 502 may include different amounts of reinforcing particles 508. For example, in one embodiment, the metal matrix composite of the coating 502 includes from 80 to 92 volume percentage of the metal 506 (e.g., nickel) and from 8 to 20 volume percentage of the reinforcing particles 508 (e.g., silicon carbide). In another embodiment, the metal matrix composite of the coating 502 includes from 84 to 88 volume percentage of the metal 506 (e.g., nickel) and from 12 to 16 volume percentage of the reinforcing particles 508. In yet another embodiment, the metal matrix composite of the coating 502 includes from 85 to 87 volume percentage of the metal 506 (e.g., nickel) and from 13 to 15 volume percentage of the reinforcing particles 508. Other volume percentages for the metal 506 and the reinforcing particles 508, respectively, may be provided.

As discussed in more detail below, due to the manufacturing process used to produce the coating 502 on the body 500 of the respective arc plate 304, the reinforcing particles 508 may be distributed homogeneously within the metal 506 of the coating 502. Such homogenous distribution of the reinforcing particles 508 within the metal 506 of the coating 502 may prevent agglomeration or cluster formation.

In one embodiment, all of the reinforcing particles 508 are a same type of reinforcing particle 508 (e.g., silicon carbide reinforcing particles). In another embodiment, the coating 502 may include two or more different types of reinforcing particles 508 (e.g., silicon carbide reinforcing particles and alumina reinforcing particles).

The coating 502 may have any number of thicknesses. In one embodiment, the coating 502 may have a thickness in a range of 7.5 μm to 12.5 μm. In other words, the coating 502 may have a thickness that varies over the at least one outer surface 504 of the body 500 of the respective arc plate 304. In another embodiment, the coating 502 may have a thickness in a range of 9.0 μm to 11.0 μm. In yet another embodiment, the thickness of the coating 502 is uniform over the at least one outer surface 504 of the body 500 of the respective arc plate 304. In such an embodiment, the uniform thickness may be 9.0 μm, 9.5 μm, 10.0 μm, 10.5 μm, or 11.0 μm. Other thicknesses of the coating 502, uniform or variable, may be provided.

Each arc plate of the plurality of arc plates 304 may include one or more additional layers (e.g., in addition to the body 500 and the coating 502). For example, the coating 502 may be a first coating (e.g., a first composite metal coating), and the respective arc plate 304 may include one or more additional coatings. In one embodiment, the one or more additional coatings may, for example, include a second composite metal coating that covers an exterior of the first composite metal coating, for example. The second composite metal coating may include a different metal and/or different reinforcing particles than the first composite metal coating. More and/or different coatings may be provided.

Advantages of the metal matrix composite coated arc plates of the present embodiments may include cost savings. With the use of, for example, an erosion-resistant composite metal coating, a number of arc plates within an arc chute assembly may be reduced. The introduction of the metal matrix composite coating does not negatively affect the magnetic character of the arc plates, and the performance of an arc chute assembly including arc plates of the present embodiments is similar compared to prior art arc plates, but with a material with an improved erosion property.

Figure 6:
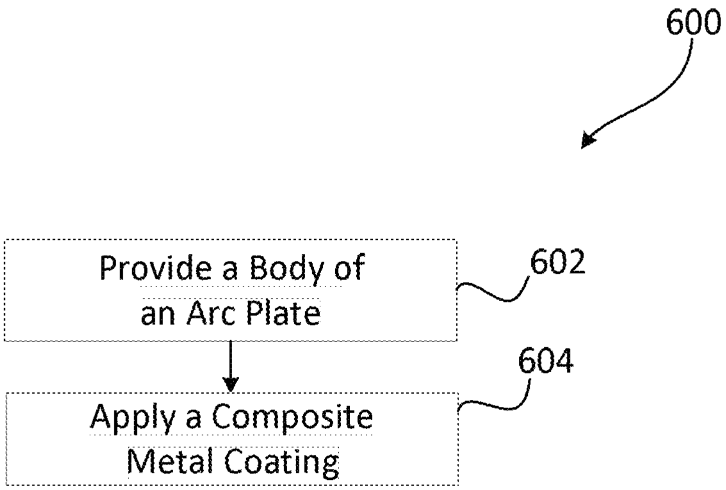
FIG. 6 is a flowchart of one embodiment of a method for manufacturing an arc plate.

FIG. 6 shows a flowchart of one embodiment of a method 600 for manufacturing an arc plate for a circuit breaker. The method 600 may be performed to manufacture an arc plate 112 of the embodiment of FIGS. 1 and 2, an arc plate 304 of the embodiment of FIGS. 3-5, or another arc plate. The flowchart of FIG. 6 illustrates the method 600 for a single arc plate. The method 600, however, may be repeated for a plurality of arc plates 112 or 304, for example. The method 600 is implemented in the order shown, but other orders may be used. Additional, different, or fewer acts may be provided.

In act 602, a body of the arc plate is provided. The body of the arc plate may be a solid part and may be any number of shapes and sizes. For example, the body of the arc plate may be U-shaped and may be sized to fit within a housing of a particular circuit breaker (e.g., pluggable circuit breaker having a width of 2.0 inches). The body of the arc plate may be made of any number of materials including, for example, low carbon steel. Low carbon steel is ductile and machinable, but may not be heat treated.

Providing the body of the arc plate may include manufacturing the body of the arc plate. The body of the arc plate may be manufactured in any number of ways. In one embodiment, a U-shaped body of the arc plate may be manufactured using stamping. For example, a sheet of low carbon steel is fed into a press, where a die is pressed (e.g., with tons of force) into or through the sheet of low carbon steel to form the U-shaped body of the arc plate. For example, a blanking technique may be used to form the U-shaped body of the arc plate using stamping. In one embodiment, the low carbon steel U-shaped body may be machined after stamping to form a final shape of the low carbon steel U-shaped body of the arc plate.

In another embodiment, a U-shaped body of the arc plate may be manufactured using casting. For example, low carbon steel is melted (e.g., into a molten material) and poured into a mold cavity taking the shape of a finished arc plate body. The molten low carbon steel is cooled (e.g., via heat removed via the mold), and the finished arc plate body is removed from the mold.

Alternatively, or additionally, other manufacturing methods may be used to manufacture the body of the arc plate. For example, a low carbon steel ingot may be machined to manufacture the body of the arc plate.

In act 604, a composite metal coating is applied to an exterior of the arc plate body provided in act 602. The composite metal coating may be applied to the exterior surface of the arc plate body provided in act 602, such that an entire exterior of the arc plate body provided in act 602 is covered by the composite metal coating.

The composite metal coating may include a metal matrix and reinforcing particles. The metal matrix may be any number of metals including, for example, nickel, and the reinforcing particles may be any number of reinforcing particles including, for example, silicon carbide particles. Other metals and/or other reinforcing particles may be used.

In one embodiment, the applying of the composite metal coating to the exterior of the arc plate body provided in act 602 includes performing an electrodeposition of nickel onto the arc plate body using a bath. The performing of the electrodeposition includes positioning, for example, a nickel anode and the arc plate body provided in act 602 within an electrolyte chemical bath, and exposing the nickel anode and the arc plate body to a continuous electrical charge. The performing of the electrodeposition may cover the arc plate body provided in act 602 in an even (e.g., uniform) coating of, for example, nickel.

The applying of the composite metal coating to the exterior of the arc plate body provided in act 602 may also include adding, for example, silicon carbide particles to the electrolyte chemical bath during the performing of the electrodeposition. The silicon carbide particles added to the electrolyte chemical bath may be any number of shapes and sizes. For example, the silicon carbide particles may be irregular in shape and may have a maximum dimension (e.g., a length) in a range of 1.0 μm to 3.0 μm. Other shapes and/or sizes of the silicon carbide particles may be added to the electrolyte chemical bath.

In one embodiment, the applying of the composite metal coating to the exterior of the arc plate body provided in act 602 may also include stirring (e.g., constantly stirring) the electrolyte chemical bath while the silicon carbide particles are being added to the electrolyte chemical bath and/or while the electrodeposition of nickel, for example, onto the arc plate body provided in act 602 is being performed. The constant stirring, for example, of the electrolyte chemical bath may provide for a homogenous distribution of, for example, the silicon carbide particles within the composite metal coating applied to the arc plate body in act 604.

The applying of the composite metal coating in act 604 may be performed until a particular thickness of the composite metal coating is reached. For example, the composite metal coating may be applied in act 604 until a thickness of the composite metal coating in a range of 7.5 μm to 12.5 μm is reached. Other thicknesses of the composite metal coating may be provided.

In one embodiment, the composite metal coating of the arc plate manufactured by the method 600 includes from 80 to 92 volume percentage of nickel, and from 8 to 20 volume percentage of silicon carbide particles. Other volume percentages of nickel and silicon carbide particles, respectively, may be provided.

The method 600 may be repeated for any number of arc plates. For example, an arc chamber for a circuit breaker may include ten arc plates, and the method 600 may be repeated ten times to manufacture the ten arc plates. The method 600 may be repeated more or fewer times for arc chambers including more or fewer arc plates.

Additional and/or different acts may be provided. For example, when the method 600 is repeated ten times, for example, to manufacture ten arc plates, the ten arc plates may be attached to a housing (e.g., a first support and a second support opposite and at a distance relative to the first support) of the arc chamber, such that the ten arc plates are stacked and separated from each other. For example, the ten arc plates may be attached to the housing of the arc chamber, such that the ten arc plates are spaced equidistantly apart (e.g., distances between adjacent arc plates are equal).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An arc plate for a circuit breaker, the arc plate comprising:

a body; and a magnetic coating that covers an exterior of the body, the magnetic coating being a metal matrix composite comprising:

from 80 to 92 volume percentage of a metal that is magnetic; and from 8 to 20 volume percentage of particles, wherein the particles have a higher melting temperature than the metal.

2. The arc plate of claim 1, wherein the metal is nickel.

3. The arc plate of claim 2, wherein the particles are silicon carbide particles.

4. The arc plate of claim 2, wherein the particles are alumina particles.

5. The arc plate of claim 1, wherein the metal matrix composite comprises:

from 84 to 88 volume percentage of nickel; and from 12 to 16 volume percentage of silicon carbide particles.

6. The arc plate of claim 5, wherein the particles are irregularly shaped.

7. The arc plate of claim 1, wherein the particles have a maximum dimension in a range of 1 μm to 3 μm.

8. The arc plate of claim 1, wherein the body is made of low-carbon steel.

9. The arc plate of claim 1, wherein the magnetic coating has a thickness in a range of 7.5 μm to 12.5 μm.

10. The arc plate of claim 1, wherein distribution of the particles within the metal is homogenous.

11. A circuit breaker comprising:

an arc chamber comprising a plurality of arc plates, each arc plate of the plurality of arc plates comprising:

a body made of steel; and a magnetic coating that covers an exterior of the body, the magnetic coating being a metal matrix composite comprising:

from 80 to 92 volume percentage of nickel; and from 8 to 20 volume percentage of silicon carbide particles.

12. The circuit breaker of claim 11, wherein the silicon carbide particles have a maximum dimension in a range of 1 μm to 3 μm.

13. The circuit breaker of claim 12, wherein the silicon carbide particles are irregularly shaped.

14. The circuit breaker of claim 11, wherein the magnetic coating has a thickness in a range of 7.5 μm to 12.5 μm.

15. The circuit breaker of claim 11, wherein the arc chamber further comprises a plastic housing, the plastic housing comprising a first support and a second support, the second support being opposite and at a distance relative to the first support, wherein opposite sides of the plurality of plates are attached to the first support and the second support, respectively, such that the plurality of plates are separated from each other.

16. A method of manufacturing an arc plate for a circuit breaker, the method comprising:

providing a steel body; and applying a composite metal coating to an exterior surface of the steel body, the applying of the composite metal coating comprising:

performing an electrodeposition of nickel onto the steel body with a bath; and adding silicon carbide particles to the bath during the performing of the electrodeposition, wherein after the applying, the composite metal coating comprises:

from 80 to 92 volume percentage of nickel; and from 8 to 20 volume percentage of the silicon carbide particles.

17. The method of claim 16, wherein providing the steel body comprises stamping a U-shaped body of low carbon steel.

18. The method of claim 16, wherein the adding comprises adding silicon carbide particles with a maximum dimension in a range between 1 μm and 3 μm.

19. The method of claim 18, wherein the silicon carbide particles are irregularly shaped.

20. The method of claim 16, wherein the applying of the composite metal coating further comprises constantly stirring the bath, such that a homogenous distribution of the silicon carbide particles is provided within the composite metal coating.

* * * * *